United States Patent
Wham

(10) Patent No.: US 12,094,061 B2
(45) Date of Patent: Sep. 17, 2024

(54) SYSTEM AND METHODS FOR UPDATING AN ANATOMICAL 3D MODEL

(71) Applicant: Covidien LP, Mansfield, MA (US)

(72) Inventor: Robert H. Wham, Boulder, CO (US)

(73) Assignee: Covidien LP, Mansfield, MA (US)

( * ) Notice: Subject to any disclaimer, the term of this patent is extended or adjusted under 35 U.S.C. 154(b) by 678 days.

(21) Appl. No.: 17/157,186

(22) Filed: Jan. 25, 2021

(65) Prior Publication Data

US 2021/0287434 A1 Sep. 16, 2021

Related U.S. Application Data

(60) Provisional application No. 62/990,028, filed on Mar. 16, 2020.

(51) Int. Cl.
*G06T 19/00* (2011.01)

(52) U.S. Cl.
CPC ...... *G06T 19/00* (2013.01); *G06T 2219/2004* (2013.01)

(58) Field of Classification Search
CPC .......................... G06T 19/00; G06T 2219/2004
See application file for complete search history.

(56) References Cited

U.S. PATENT DOCUMENTS

| | | |
|---|---|---|
| 4,543,959 A | 10/1985 | Sepponen |
| 5,800,350 A | 9/1998 | Coppleson et al. |
| 5,957,849 A | 9/1999 | Munro |
| 5,991,697 A | 11/1999 | Nelson et al. |
| 6,006,127 A | 12/1999 | Van Der Brug et al. |
| 6,109,268 A | 8/2000 | Thapliyal et al. |
| 6,241,725 B1 | 6/2001 | Cosman |
| 6,428,537 B1 | 8/2002 | Swanson et al. |
| 6,546,270 B1 | 4/2003 | Goldin et al. |
| 6,569,098 B2 | 5/2003 | Kawchuk |
| 6,569,160 B1 | 5/2003 | Goldin et al. |
| 6,837,855 B1 | 1/2005 | Puech |
| 6,889,075 B2 | 5/2005 | Marchitto et al. |
| 7,089,045 B2 | 8/2006 | Fuimaono et al. |
| 7,099,712 B2 | 8/2006 | Fuimaono et al. |
| 7,155,270 B2 | 12/2006 | Solis et al. |
| 7,207,989 B2 | 4/2007 | Pike, Jr. et al. |
| 7,228,164 B2 | 6/2007 | Fuimaono et al. |
| 7,257,434 B2 | 8/2007 | Fuimaono et al. |
| 7,257,435 B2 | 8/2007 | Plaza |

(Continued)

*Primary Examiner* — Santiago Garcia
(74) *Attorney, Agent, or Firm* — Carter, DeLuca & Farrell LLP

(57) ABSTRACT

A system for updating a three dimensional (3D) model based on a deformed or displaced anatomical structure in a body includes a first imaging device configured to capture an image inside of a body, a location sensor installed in the first imaging device and configured to identify a location of the first imaging device, a memory configured to store one or more programs and a 3D model of at least a portion of the body, and a controller. The controller is configured to perform the one or more programs to identify a location of an anatomical structure, which is captured in the image, in the body based on the location of the location sensor, and/or to identify a shape of the anatomical structure in the image. The controller updates, as necessary, the 3D model based on the location and/or the shape of the anatomical structure.

18 Claims, 6 Drawing Sheets

(56) References Cited

U.S. PATENT DOCUMENTS

| | | |
|---|---|---|
| 7,302,285 B2 | 11/2007 | Fuimaono et al. |
| 7,615,015 B2 | 11/2009 | Coleman |
| 7,706,882 B2 | 4/2010 | Francischelli et al. |
| 7,819,860 B2 * | 10/2010 | Wittenberger ......... A61B 18/02 606/23 |
| 7,917,312 B2 | 3/2011 | Wang et al. |
| 7,967,742 B2 * | 6/2011 | Hoeg ..................... A61B 90/36 600/173 |
| 8,183,745 B2 | 5/2012 | Trolier-McKinstry et al. |
| 8,617,155 B2 * | 12/2013 | Johnson ............. A61B 18/1233 606/34 |
| 9,375,196 B2 * | 6/2016 | Zheng .................. A61B 8/5223 |
| 9,730,672 B2 | 8/2017 | Zheng et al. |
| 11,160,610 B2 * | 11/2021 | Hladio ................... A61B 34/20 |
| 2003/0045798 A1 | 3/2003 | Hular et al. |
| 2003/0120306 A1 | 6/2003 | Burbank et al. |
| 2004/0221853 A1 | 11/2004 | Miller |
| 2005/0027199 A1 | 2/2005 | Clarke |
| 2005/0143662 A1 | 6/2005 | Marchitto et al. |
| 2005/0217381 A1 | 10/2005 | Falk |
| 2006/0036162 A1 | 2/2006 | Shahidi et al. |
| 2006/0106375 A1 | 5/2006 | Werneth et al. |
| 2006/0184042 A1 * | 8/2006 | Wang .................. A61B 5/0073 600/476 |
| 2007/0106289 A1 | 5/2007 | O'Sullivan |
| 2007/0156128 A1 | 7/2007 | Jimenez |
| 2007/0167943 A1 | 7/2007 | Janssen et al. |
| 2007/0239007 A1 | 10/2007 | Silverman et al. |
| 2007/0248254 A1 | 10/2007 | Mysore Siddu et al. |
| 2008/0065178 A1 * | 3/2008 | Kelleher .............. A61B 5/4893 607/117 |
| 2009/0088634 A1 | 4/2009 | Zhao et al. |
| 2009/0163904 A1 * | 6/2009 | Miller .................... A61B 5/053 606/33 |
| 2009/0216129 A1 | 8/2009 | Lasser et al. |
| 2009/0267773 A1 * | 10/2009 | Markowitz ........... A61B 5/063 340/573.1 |
| 2009/0287223 A1 | 11/2009 | Pua et al. |
| 2009/0318756 A1 * | 12/2009 | Fisher ...................... A61B 1/04 600/109 |
| 2010/0023004 A1 | 1/2010 | Francischelli et al. |
| 2010/0217117 A1 | 8/2010 | Glossop et al. |
| 2011/0106052 A1 | 5/2011 | Chiang et al. |
| 2011/0230710 A1 | 9/2011 | Hoeg et al. |
| 2012/0010506 A1 * | 1/2012 | Ullrich .................... A61B 8/12 600/440 |
| 2012/0016269 A1 * | 1/2012 | Moctezuma de la Barrera .......... A61B 6/037 600/595 |
| 2012/0071757 A1 | 3/2012 | Salcudean et al. |
| 2012/0136242 A1 * | 5/2012 | Qi ........................ A61B 8/5223 604/95.01 |
| 2013/0218024 A1 | 8/2013 | Boctor et al. |
| 2014/0276002 A1 * | 9/2014 | West ....................... G06T 19/00 600/424 |
| 2016/0302869 A1 * | 10/2016 | Chopra ................. A61B 34/30 |
| 2016/0307331 A1 * | 10/2016 | Mollus .................. G16H 30/40 |
| 2020/0107886 A1 | 4/2020 | Govari ................. A61B 90/361 |
| 2020/0275824 A1 | 9/2020 | Tata ..................... A61B 1/0052 |
| 2021/0169577 A1 * | 6/2021 | Hornecker ............ A61B 34/20 |
| 2021/0244311 A1 * | 8/2021 | Zhao ..................... A61B 1/0005 |
| 2021/0282662 A1 * | 9/2021 | Duindam .............. A61B 5/066 |

* cited by examiner

SYSTEM AND METHODS FOR UPDATING AN ANATOMICAL 3D MODEL

CROSS-REFERENCE TO RELATED APPLICATIONS

This application claims the benefit of, and priority to, U.S. Provisional Patent Application No. 62/990,028, filed on Mar. 16, 2020, the entire contents of which are hereby incorporated herein by reference.

FIELD

The present disclosure relates to systems and methods for updating an anatomical three-dimensional (3D) model. More particularly, the present disclosure relates to systems and methods for updating the anatomical 3D model based on deformation and/or displacement of anatomical structure(s) captured in an image during a surgical operation.

BACKGROUND

Prior to a surgical operation, images of a patient may be captured to generate an anatomical 3D model and to locate a target anatomical structure for the surgical operation. Surgeons make a plan regarding how to navigate toward the target structure and/or regarding how to perform an operation on the target structure generally based on the anatomical 3D model and/or the previously captured images. However, during the surgical operation, anatomical structures may move or be deformed from the anatomical 3D model and/or the previously captured images. Thus, the location, shape, and/or other properties of the target structure during the surgical operation may differ from those identified by the anatomical 3D model.

SUMMARY

As used herein, the term "distal" refers to the portion that is described which is farther from an operator (whether a human surgeon or a surgical robot). Terms including "generally," "about," "substantially," and the like, as utilized herein, are meant to encompass variations, e.g., manufacturing tolerances, material tolerances, use and environmental tolerances, measurement variations, and/or other variations, up to and including plus or minus 10 percent. Further, any or all of the aspects described herein, to the extent consistent, may be used in conjunction with any or all of the other aspects described herein.

This disclosure generally relates to updating an anatomical 3D model based on a deformed or displaced anatomical structure(s) captured in an image during a surgical operation so as to improve accuracy about the location, shape, and/or other properties of a target anatomical structure(s).

Provided in accordance with aspects of the disclosure is a system for updating a three dimensional (3D) model based on a deformed or displaced anatomical structure in a body. The system includes a first imaging device configured to capture an image inside of a body, a location sensor installed in the first imaging device and configured to identify a location of the first imaging device, a memory configured to store one or more programs and a 3D model of at least a portion of the body, and a controller. The controller is configured to perform the one or more programs to identify a location of an anatomical structure, which is captured in the image, in the body based on the location of the location sensor. The controller is additionally or alternatively configured to identify a shape of the anatomical structure in the image. The controller updates, if necessary, the 3D model based on the location and/or the shape of the anatomical structure.

In aspects, the system further includes a second imaging device configured to capture an image of an external environment of the body.

In aspects, the controller is further configured to identify a gravitational direction and a position of the body based on the image captured by the second imaging device.

In aspects, the 3D model is updated by moving a non-stable anatomical structure based on the gravitational direction and the position of the body. The non-stable anatomical structure changes its location depending on the gravitational direction and the position of the body.

In aspects, the controller is further configured to determine whether or not the location of the anatomical structure is different from a location of a corresponding anatomical structure in the 3D model.

In aspects, the controller is further configured to update the location of the anatomical structure in the 3D model based on the location of the anatomical structure captured in the image, when it is determined that the location of the anatomical structure is different from the location of the corresponding anatomical structure.

In aspects, the controller is further configured to determine whether or not the anatomical structure captured by the first imaging device has a zoomed shape of a corresponding anatomical structure of the 3D model.

In aspects, the controller updates the shape of the corresponding anatomical structure in the 3D model based on the shape of the corresponding anatomical structure of the 3D model, when it is determined that the anatomical structure captured by the first imaging device does not have the zoomed shape of the corresponding anatomical structure in the 3D model.

In aspects, the one or more programs are trained by a method for updating a three dimensional (3D) model based on a deformed or displaced anatomical structure in a body. The method includes receiving a 3D model of at least a portion of a body, capturing, by a first imaging device, an image inside of the body, identifying, by a location sensor installed in the first imaging device, a location of the first imaging device, identifying a location of an anatomical structure, which is captured in the image, in the body based on the location of the location sensor, identifying a shape of the anatomical structure in the image, and updating the 3D model based on the location and the shape of the anatomical structure.

In aspects, the method further includes capturing, by a second imaging device, an image of an external environment of the body.

In aspects, the method further includes identifying a gravitational direction and the position of the body based on the image captured by the second imaging device.

In aspects, the 3D model is updated by moving a non-stable anatomical structure based on the gravitational direction and the position of the body.

In aspects, the non-stable anatomical structure changes its location depending on the gravitational direction and the position of the body.

In aspects, the method further includes determining whether or not the location of the anatomical structure is different from a location of a corresponding anatomical structure in the 3D model.

In aspects, the method further includes updating the location of the anatomical structure in the 3D model based on the location of the anatomical structure captured in the image, when it is determined that the location of the anatomical structure is different from the location of the corresponding anatomical structure.

In aspects, the method further includes determining whether or not the anatomical structure captured by the first imaging device has a zoomed shape of a corresponding anatomical structure in the 3D model.

In aspects, the method further includes updating the shape of the corresponding anatomical structure in the 3D model based on the shape of the anatomical structure in the image captured by the first imaging device, when it is determined that the anatomical structure captured by the first imaging device does not have the zoomed shape of the corresponding anatomical structure in the 3D model.

Provided in accordance with aspects of the disclosure is a nontransitory computer-readable storage medium storing a program for causing a computer to execute a method for updating a three dimensional (3D) model based on a deformed or displaced anatomical structure in a body. The method includes receiving a 3D model of at least a portion of a body, capturing, by a first imaging device, an image inside of the body, identifying, by a location sensor installed in the first imaging device, a location of the first imaging device, identifying a location of an anatomical structure, which is captured in the image, in the body based on the location of the location sensor, identifying a shape of the anatomical structure in the image, and updating the 3D model based on the location and the shape of the anatomical structure.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Surgical operations involve operations to target anatomical structures. Difficulties may arise due to a limited view, poor visibility, lack of tactile response, confusion of the anatomy from patient to patient, and/or inadequate control of the instrumentation being utilized during surgical operations. Further, some anatomical structures move themselves and/or as a result of other movement, e.g., due to movements of surgical instrumentation, other anatomical structures, etc. Furthermore, some anatomical structures are not stable with respect to a gravitational direction. Thus, even though locations of anatomical structures may have been examined and identified in an anatomical 3D model prior to a surgical operation, such locations during the surgical operation might not be same as in the 3D model. Additionally, after the modeling and prior to the surgical operation, some anatomical structures may be deformed through other surgical operations. Thus, during the surgical operation, shapes of internal anatomical structures might not be same as those in the 3D model. Thus, it is advantageous to update the 3D model based on deformed or displaced anatomical structures during the surgical operation. Systems and methods in accordance with the present disclosure are provided for updating the 3D model based on displaced or deformed anatomical structures during a surgical operation. Other aspects and features of the present disclosure are detailed below.

Figure 1:
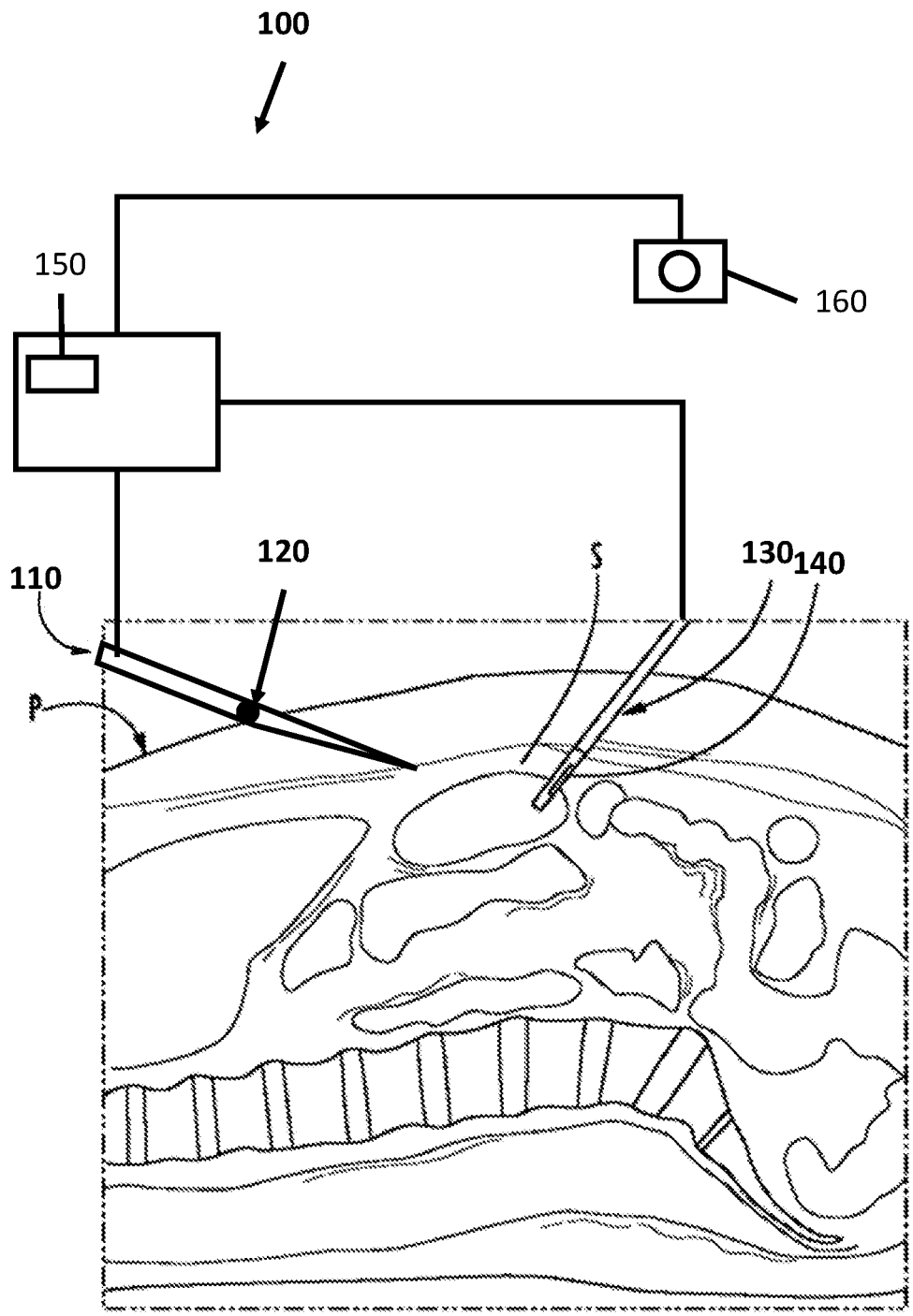
FIG. 1 is a graphical diagram of a deformation system with an illustration of a surgical site in accordance with aspects of the present disclosure.

FIG. 1 shows a graphical diagram of a deformation system 100, which updates, e.g., deforms, moves, etc., an anatomical 3D model based on a displaced or deformed anatomical structure(s) according to aspects of the present disclosure. The deformation system 100 may be connected to or incorporated into a surgical system, and thus the terms deformation system and surgical system are be synonymously used in this disclosure. The surgical system 100 may use any type of energy to treat a target anatomical structure. The type of energy may include mechanical energy, acoustic energy, thermal energy, electrical energy, electromagnetic (EM) energy (e.g., optical energy or radio frequency (RF) energy), or ultrasonic energy. The surgical system 100 may use EM waves to determine a location of one or more elements of the surgical system 100 and synchronize the patient's anatomy with the anatomical 3D model of the patient's anatomy. Further, the deformation system 100 may update the 3D model based on the actual location and/or shape of a target anatomical structure during the surgical operation. By doing so, the deformation system 100 helps clinicians to perform the surgical operation with improved accuracy as to the location and/or shape of the target anatomical structure.

Prior to or concurrently with surgical operations, the 3D model may be generated to visually display a patient's anatomy. During an imaging/planning stage, a computer utilizes computed tomography (CT) image data or other image data, which may be in the Digital Imaging and Communications in Medicine (DICOM) format, for generating and viewing an anatomical 3D model of the patient's body or portion thereof. In aspects, the 3D model may be generated in real time based on live video. The 3D model and image data derived from the 3D model enables identification of the region of interest (automatically, semi-automatically, or manually), and allows for the selection of a pathway to the target anatomical structure or a region of interest. More specifically, the CT scans are processed and assembled into a 3D volume, which is then utilized to generate the 3D model of the patient's body or portion thereof. The deformation system 100 may store the 3D model or receive the 3D model from another computing device, which has generated or stored the 3D model. The deformation system 100 may be coupled to a display and cause the display to display the 3D model on its screen. Since the display is common and prevalent in imaging/display areas, the display is not shown in FIG. 1 and detail description thereof is not provided.

The deformation system 100 may include a surgical instrument 110, an endoscope 130, a controller 150, and an imaging device 170. The surgical instrument 110 may have a location sensor 120 installed thereon or associated therewith. The surgical system 100 may use EM waves to identify a location of the location sensor 120 and calculate the location of the surgical instrument 110, which may be synchronized with the 3D model, based on the location of the location sensor 120. Further, the deformation system 100 may identify non-target anatomical structure, which can be critical to physiology of the patient, based on the 3D model, and warn the clinician when the non-target anatomical structure is in close proximity to the surgical instrument 110. By doing so, the deformation system 100 helps clinicians to perform surgical operations without unintentionally damaging the non-target anatomical structures.

Regarding anatomical structures, some anatomical structures (e.g., the spine) are stable while other anatomical structures (e.g., the heart and lung) are constantly moving. Further, some anatomical structures (e.g., liver, intestines, stomach, etc.) are not stable with respect to a gravitational direction, meaning that their locations differ depending on the gravitational direction. Thus, concurrent or on-the-fly identification of locations of anatomical structures would enhance performance of surgical operations and prevention of unintentional damages to anatomical structures.

In aspects, the location sensor 120 of the surgical instrument 110 may be an electromagnetic (EM) sensor. In this regard, the deformation system 100 may include an EM wave generator, which is not shown. When a patient is placed on a surgical table for receiving a surgical operation, an EM wave is generated by the EM wave generator. The generated EM wave surrounds the patient. The location sensor 120, which may be installed/fixed on the surgical instrument 110 by a predetermined distance from its distal tip or other point of reference, senses the strength of the EM wave at the position of the location sensor 120. Based on the strength of the EM wave, the deformation system 100 may be capable of estimating a location of the surgical instrument 110 with respect to an origin of the EM coordinate system. The location sensor 120 may be installed on another element of the deformation system 100 to monitor the spatial relationship within the deformation system 100. The EM navigation may be guided based on a time of arrival at the target anatomical structure or other landmark anatomical structures.

Navigation is not limited to EM navigation but can include other navigational methods as appreciated by a person having skill in the art. For example, optical tracking may be used in navigation based on the endoscope 130. Images captured by the endoscope 130 may be used to track a location of the endoscope 130. Also, optical tracking may be used together with EM navigation so that the location of the endoscope 130 may be tracked with higher accuracy.

Furthermore, markers implanted in the body of the patient may be used in navigation. When the markers are captured in the images, the characteristics of the markers (e.g., size and shape) may be used to identify location of the markers, the image-capturing direction, and/or a distance from the endoscope 130 to the position of the markers. Thus, the location of the endoscope 130 or the surgical instrument 110, which is captured in the images, may be identified and tracked.

The deformation system 100 may synchronize the EM coordinate system with the coordinate system of the 3D model. A graphical representation of the surgical instrument 110 may be displayed at the corresponding location in the 3D model in an augmented way on the screen of the display. Thus, when the 3D model is moved or rotated, the graphical representation of the surgical instrument 110 is correspondingly moved or rotated.

Based on the 3D model, the deformation system 100 may identify the target anatomical structure and non-target anatomical structures around the target anatomical structure prior to the surgical operation. In this regard, the controller 150 of the deformation system 100 facilitates identifying the anatomical structures.

The endoscope 130 may be inserted into the patient "P" and is configured to provide live views or frame images of the surgical site "S" and to transmit images to the deformation system 100. The endoscope 130 may include a camera to capture images of the surgical site "S" and the surgical instrument 110 during navigation and the surgical operation. The camera may be an ultrasonic imaging device, a laser imaging device, a fluorescent imaging device, or any other imaging device, which is capable of producing real-time frame images. In an aspect, the endoscope 130 may capture stereo-images having depth information. In another aspect, the endoscope 130 may capture 3D information. In this regard, the endoscope 130 may have a binocular vision or may be a light detection and ranging (LIDAR), ultrasonic imaging, etc. In further aspect, artificial intelligence may process 2D images to generate a 3D representation.

Based on a received frame image(s), the controller 150 of the deformation system 100 may identify an anatomical structure and a location and a shape thereof in the received frame image(s). The controller 150 may utilize artificial intelligence, also referred to as machine learning, to identify the anatomical structures. Further, the controller 150 may also identify a location and a shape of each anatomical structure based on a location sensor 140 installed/fixed on the endoscope 130 and/or image processing.

In aspects, the controller 150 may further estimate a location and a shape of the anatomical structure in the coordinate system of the 3D model, and compare the location and shape of the corresponding anatomical structure in the 3D model with the estimated location and shape of the anatomical structure captured in the images. When they are different from each other, the controller 150 may deform or update the 3D model to best reflect the actual location and shape of the anatomical structure captured in the images.

Figure 3A:
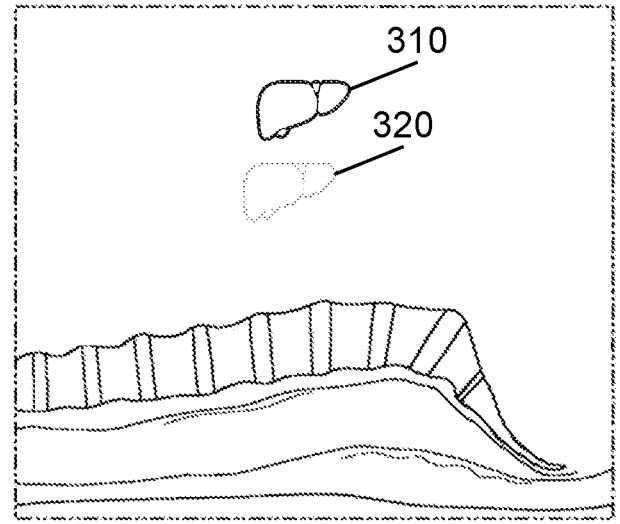
FIGS. 3A and 3B are graphical illustrations of a displaced or deformed target anatomical structure at a surgical site in accordance with aspects of the present disclosure.
Figure 3B:
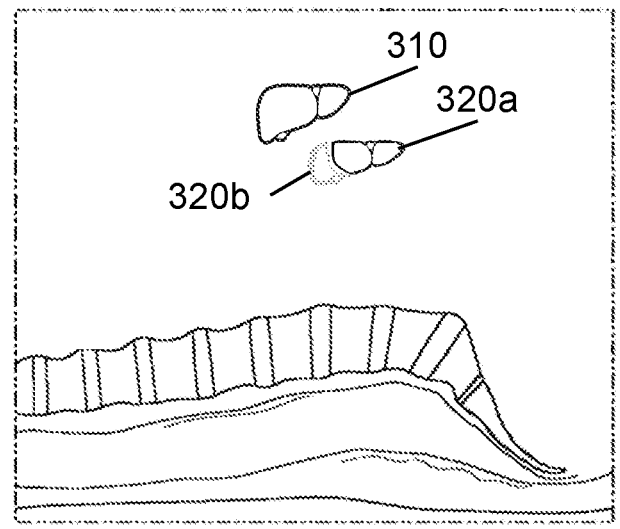

For example, two livers 310 and 320a are shown in FIG. 3B. The liver 310 is located based on the 3D model and the liver 320a is located based on the actual location in the images captured by the endoscope 130. For explanation purpose only, a cut-out portion 320b of the liver 320a is also shown in faded gray color. The cut-out portion 320b may be cut-out from the whole liver by previous surgical operations. As such, the liver 320a has been deformed from the initial shape of the liver 310. Further, the location of the liver 320a is different from the location of the corresponding liver 310 in the 3D model.

To facilitate performing the surgical operation, the 3D model is updated to reflect the actual location and shape of the target anatomical structure, for example, the location and shape of the liver 320a. The controller 150 may be trained by a machine learning algorithm to deform and update the 3D model according to anatomical structures shown in the image captured by the endoscope 130. For example, the controller 150 may identify all anatomical structures shown in the images captured by the endoscope 130 and estimate the corresponding locations in coordinate system of the 3D model. Based on the estimated locations, the controller 150 may update locations of other anatomical structures in the 3D model, which are not shown in the images, and deform the 3D model correspondingly. As a result, the deformed or otherwise updated 3D model may display the anatomical structures corresponding to the actual locations.

In aspects, the controller 150 may proportionally update locations of other anatomical structures of the 3D model, which are not shown in the captured images, based on a distance between the anatomical structures shown in the images and stable anatomical structures (e.g., head, spine, etc.). For example, when the anatomical structure is moved by one inch, locations of anatomical structures located between the anatomical structures shown in the images and the stable anatomical structures are moved or deformed proportionally.

Regarding deformation of the shape, the controller 150 may utilize zoom-in, zoom-out, affine transformation, morphing, or any other image techniques to update the shape of the target organ in the 3D mode according to the actual shape of the target organ. Regarding dislocation of anatomical structures, the controller 150 may move the anatomical structure in the 3D model. Further, the controller 150 may proportionally move other anatomical structures, which are connected to the anatomical structure, based on a level of connectivity. For example, a gall bladder is closely connected to the liver. Thus, when the liver is to be moved in the 3D model, the gall bladder is to be moved at the same or similar level as the liver. On the other hand, a bladder may be loosely connected to the liver. Thus, the bladder may not be moved as much or not at all as the liver is moved, but may instead be moved based on a gravitational direction, as will be described with respect to FIG. 3A below.

Once the 3D model is updated, the deformed portion of the updated 3D model may be highlighted so that the deformed portion may be easily seen or bring surgeon's attention.

Referring back to FIG. 1, the imaging device 160 located outside of the body of the patient "P" may capture images of the environment of the patient "P." The captured images by the imaging device 160 may be transmitted to the controller 150, which then identifies a gravitational direction. Since some anatomical structures may change their locations based on the gravitational direction, the controller 150 may automatically update the locations of the anatomical structures in the 3D model to reflect the gravitational direction. For example, two livers 310 and 320 are shown in FIG. 3A. The liver 310 is located based on the 3D model and the liver 320 is located based on the image captured by the endoscope 130. As shown in FIG. 3A, locations of two livers 310 and 320 are different from each other in a vertical direction in FIG. 3A or along the direction towards the spine. Such a difference in the locations may be caused by gravity. The controller 150 may be trained to learn how much anatomical structures are displaced based on different gravitational directions. Thus, when the patient lies on a surgical operation bed in a direction different from the direction when the 3D model was generated, the controller 150 may automatically move the anatomical structures in the 3D model based on the gravitational direction so that the anatomical structures in the 3D model reflect the actual locations thereof on the surgical operation bed.

In aspects, anatomical structures may be deformed and displaced based on both the gravitational direction and previously performed surgical operations. In this case, the controller 150 may perform procedures for cases shown in FIGS. 3A and 3B concurrently or in order to properly update locations and shapes of anatomical structures in the 3D model. Further, displacement and deformation are not limited to previously performed surgical operations and gravitational directions but may be based on any instrument manipulations, introduction or removal of fluids, e.g., insufflation fluid, and/or any other acts (passive or active, direct or indirect) that may alter the position and/or shape of an anatomical structure.

In aspects, the surgical system 100 may include one or more robotic arms to perform surgical operations and capture images. The robotic arms may be controlled by a surgeon.

Figure 2A:
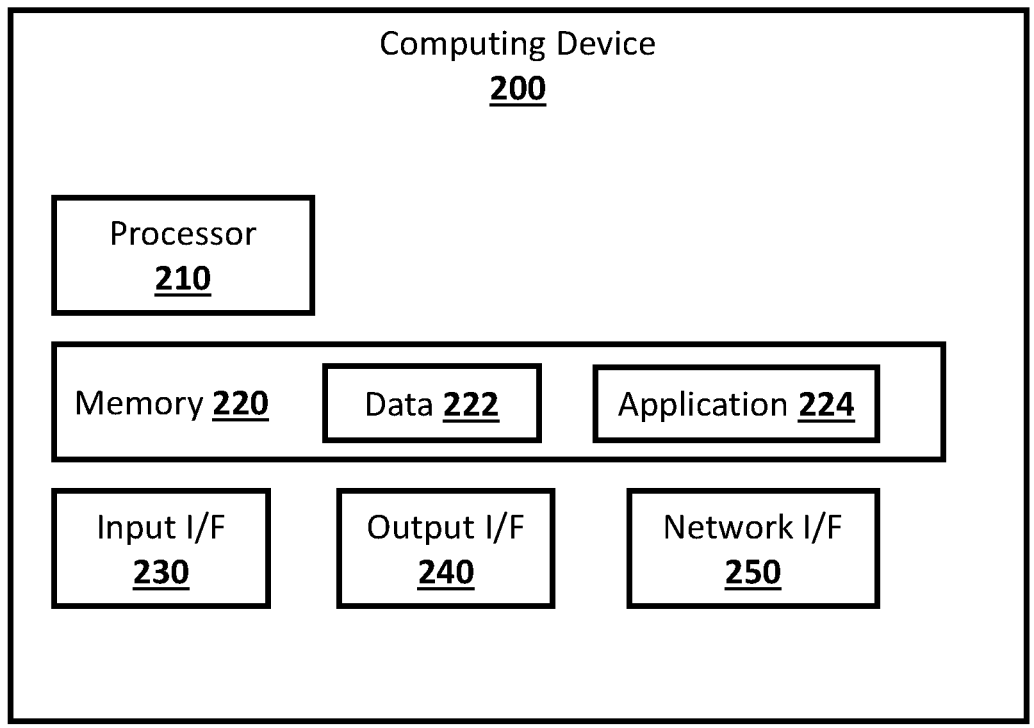
FIG. 2A is a functional block diagram of a computing device in accordance with aspects of the disclosure.

Referring now to FIG. 2A, a functional block diagram of a computing device 200 is shown according to aspects of the present disclosure. The computing device 200 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, embedded computers, and autonomous vehicles. Those of skill in the art will recognize that many smartphones are suitable for use in the system described herein. Suitable tablet computers include those with booklet, slate, and convertible configurations, known to those of skill in the art.

The computing device 200 includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Though not explicitly shown, the computing device 200 or one or more components thereof may represent one or more components (e.g., the controller 150) of the surgical system 100. The computing device 200 may include a processor 210, a memory 220, an input interface 230, an output interface 240, a network interface 250, or any desired subset of components thereof.

The processor 210 may include a microcontroller, central processing unit (CPU), application specific integrated circuit (ASIC), arithmetic co-controller, graphic controller, or image controller, each of which is electronic circuitry within a computer that carries out instructions of a computer program by performing the basic arithmetic, logical, control and input/output (I/O) operations specified by the instructions.

The memory 220 may include non-transitory computer-readable storage medium for storing data and software which include instructions that may be executed by the processor 210. When executed, the instructions may cause the processor 210 to control operation of the computing device 200 such as, without limitation, reception and transmission of signals received in response to movement and/or actuation of the surgical instrument 110, image processing to deform or move anatomical structures in the 3D model, identification of anatomical structures captured in images by using machine learning algorithm or artificial intelligence, etc. The memory 220 may include one or more solid-state storage devices such as flash memory chips. Additionally, the memory 220 may include one or more mass storage devices in communication with the processor 210 through a mass storage controller and a communications bus (not shown). Although the description of computer readable medium described in this disclosure refers to a solid-state storage device, it will be appreciated by one of ordinary skill that computer-readable medium may include any available storage medium that can be accessed by the processor 210. More particularly, the computer readable storage medium may include, without limitation, non-transitory, volatile, non-volatile, removable, non-removable medium, and the like, which is implemented in any method of technology for storage of information such as computer readable instructions, data structures, program modules, or other suitable data access and management systems. Examples of computer-readable storage medium may further include random access memory (RAM), read-only memory (ROM), erasable programmable ROM (EPROM), electrically erasable programmable ROM (EEPROM), flash memory, or other known solid state memory technology, CD-ROM, DVD, Blu-Ray, or other optical storage, magnetic cassettes, magnetic tape, magnetic disk storage or other magnetic storage devices, or any other medium which may be used to store information and which can be accessed by the computing device 200.

In aspects, the memory 220 stores data 222 and/or one or more applications 224. Such applications 224 may include instructions which are to be executed by the processor 210 of the computing device 200. The data 222 may include control parameters for a machine learning algorithm or artificial intelligence, a 3D mode, a revised/deformed 3D model, and information about the patient, surgical operations, etc.

The applications 224 may include instructions which cause an input interface 230 and/or an output interface 240 to receive and transmit signals, respectively, to and from the various components of the surgical system 100. Additionally or alternatively, the computing device 200 may transmit the signals for analysis and/or display via the output interface 240. For example, the memory 220 may include instructions which, when executed, generate a 3D model, identify a location and a shape of a target anatomical structure captured in an image, deform the 3D model to reflect actual location and shape of the target, perform image processing, etc.

Further, the applications 224 may include a machine learning algorithm or artificial intelligence, and the computing device 200 may function as a machine learning or artificial intelligence system, which is trained with previous surgical videos/frame images with associated tagged information.

Figure 2B:
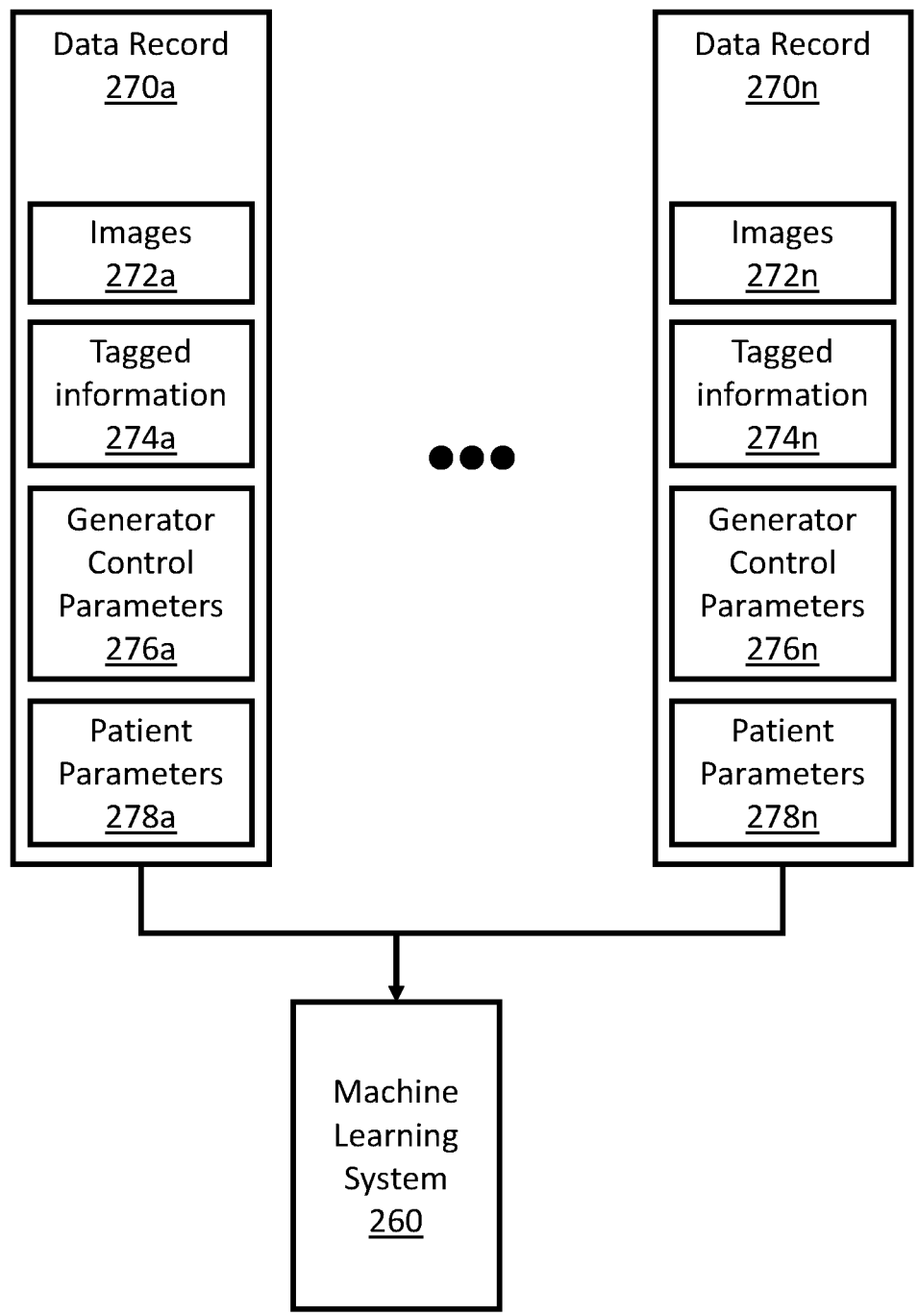
FIG. 2B is a block diagram of a machine learning or artificial intelligence system in accordance with aspects of the disclosure.

Now referring to FIG. 2B, provided is a block diagram of a machine learning system 260, which may be implemented by the computing device 200 of FIG. 2A. The machine learning system 260 may be trained by a plurality of data records 270a-270n. Videos and frame images of previous surgeries may form one set of the data records. For example, the data record 270a may include frame images/videos 272a, tagged information 274a associated with the frame images 272a, and, if relevant, control parameters 276a for identifying locations and shapes of anatomical structures in images. In an aspect, one surgery may be divided into several stages. In this case, the data record 270a may include a plurality of sets of the data record 270a, and each set may include frame images, tagged information, and control parameters, for one stage. In another aspect, each stage may be considered to be separate from the other stages. As such, one surgery may result in two or more sets of the data records.

For simplicity, one letter (e.g., a-n) affixed to the end of a numeral may be omitted hereafter unless such is necessary. For example, the tagged information 274 may represent one or more of the tagged information 274a-274n. The tagged information 274 may be manually or automatically added to or embedded in the frame images 272. For example, medical professionals may manually tag information in the frame images 272 or a tagging algorithm may process the frame images 272 and automatically tag information in the frame images 272. In an aspect, voices of medical professionals may be recorded and automatically tagged the frame images 272 based on the recorded voices.

In another aspect, the frame images 272, the tagged information 274, the control parameters 276, and patient parameters 278 of a previously performed surgery generates one data record 270. One data record 270 may be separate, independent from another of the plurality of data records 270a-270n generated from other surgeries.

The machine learning or artificial intelligence system (hereinafter the machine learning system) 260 may be trained by the plurality of the data records 270a-270n. In an aspect, the machine learning system 260 may be trained with data records, which have been generated from surgeries similar to the current surgery. In this case, the machine learning system 260 may be trained by a supervised or reinforcement learning method. In a case when the plurality of data records 270a-270n are generated from various surgeries, the machine learning system 260 may be trained by unsupervised learning. In another aspect, the machine learning system 260 may include, but not limited to, convolutional neural networks, recurrent neural networks (RNN), Bayesian Regression, Naive Bayes, nearest neighbors, least squares, means, and support vector regression, among other data science and artificial science techniques.

The tagged information 274 may have one or more levels. The first level is global, meaning that the tagged information in the first level is effective throughout the entire video or image frames, and the second level is local, meaning that the tagged information in the second level is effective for a portion of the video or the frame images. The first level information may include a type of surgery, a target organ, a position of the target organ, and a surgery plan including a range of appropriate surgery angles. The second level information may include information about anatomical structures, such as locations and shapes of anatomical structures captured in images.

Doctors, experts, or medical professionals may add the tagged information 274 to the frame images 272. For example, the target organ and non-target critical organs may be tagged. Locations and shapes of such organs may also be tagged. The machine learning system 260 may process the images 272 with the associated or corresponding tagged information 274, adjust, update, and revise internal control parameters of the machine learning system 260, and store the internal control parameters in a configuration file.

In aspects, the tagged information 274 may further include surgical procedural information related to the surgical operation. The surgical procedural information may indicate progression of the surgical operations to the target organ. For example, when a liver may be resected during the surgical operation, the change in the shape of the liver may be tagged.

The surgical procedural information may further include hemodynamics during the surgery. During tissue dissection or tissue approximation, bleeding might occur. The surgical procedural information may indicate whether or not bleeding occurred or how much bleeding has occurred.

Furthermore, other information related to the surgical operation may be tagged so that the machine learning system 260 may be trained with these pieces of tagged information.

The control parameters 276 may be parameters for image processing. The control parameters 276 may be saved in a database or memory because it is not likely the control parameters 276 can be acquired or obtained from processing the frame images 272.

The data records 270 may further include patient parameters 278. The patient parameters 276 may include a patient's age, tissue moisture, hydration, and/or tissue location within the patient's body, among other patient characteristics. In aspects, the data relating to the patient parameters 278 may be entered into the data records 270 manually or automatically from the patient's medical records. Since the patient parameters 278 may not be acquired from image processing of the images 272, the patient parameters 278 may be saved in a database or memory as the control parameters 276.

After processing and learning from the data records 270 generated from the previous surgeries, the machine learning system 260 is then able to process real-time frame images/videos of a current surgical operation and deform the 3D model on the fly during the surgical operation. For example, when one or more real-time frame images show that the target organ is displaced from the corresponding location in the 3D model, the machine learning system 260 may move the target organ and other related organs in the 3D model to reflect the actual location of the target organ. Or when one or more real-time frame images show that the target organ is deformed from that of the 3D model, the machine learning system 260 may change the shape of the target organ of the 3D model to reflect the actual shape of the target organ.

Now referring back to FIG. 2A, the output interface 240 may further transmit and/or receive data via a network interface 250 via one or more wireless configurations, e.g., radio frequency, optical, Wi-Fi®, Bluetooth® (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE® 802.15.4-2003 standard for wireless personal area networks (WPANs)). Although depicted as a separate component, the network interface 250 may be integrated into the input interface 230 and/or the output interface 240.

Figure 4:
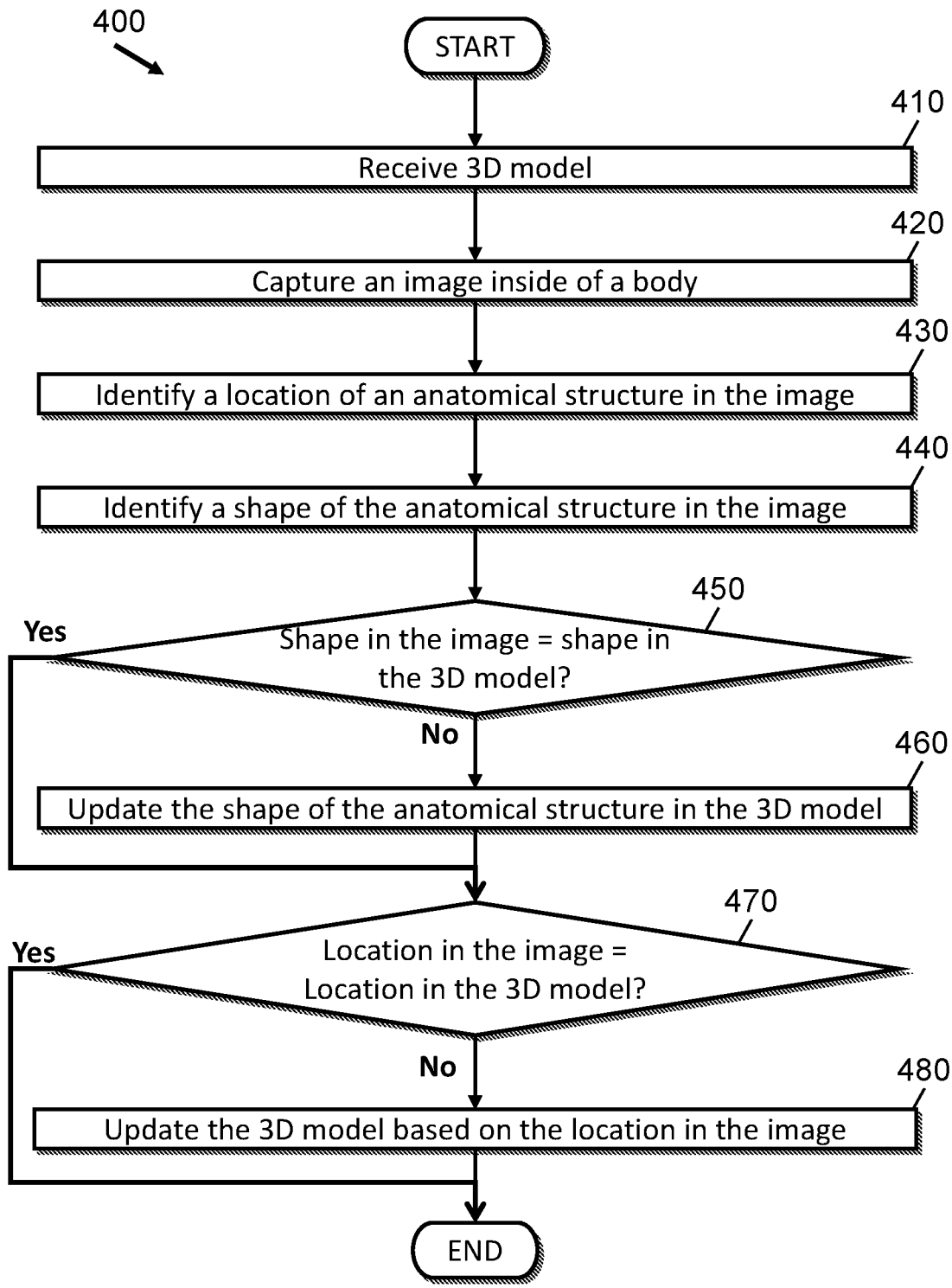
FIG. 4 is a flowchart for updating a 3D model based on displacement or deformation of an anatomical structure in accordance with aspects of the present disclosure.

FIG. 4 shows a method 400 for updating a 3D model based on a location and a shape of a target anatomical structure according to aspects of the present disclosure. The method 400 starts by receiving a graphical representation, e.g., a 3D model, of a patient in step 410. The 3D model may include a target anatomical structure in the patient based on CT image data or other image data in the DICOM format. The 3D model may also include anatomical structures, which are critical and non-critical. Further, the 3D model may include stable anatomical structures (e.g., head, spine, etc.) and non-stable structures (e.g., heart, lung, etc.). Furthermore, the 3D model may include locations and shapes of such anatomical structures.

In an aspect, in step 410, the patient's electronic medical record (EMR) may be acquired. The EMR includes patient parameters regarding age, sex, conditions, height, weight, BMI (body to mass index), previous surgeries, etc. These parameters may be used to determine tissue structural conditions. Furthermore, the EMR may include information that indicates non-standard anatomical structure.

In step 420, an endoscope may capture or generate images inside of the patient along the way toward the target organ. The captured images may be processed by a machine learning algorithm or artificial intelligence, which has been trained with previously captured images and tagged information. The captured image may include an anatomical structure, which may be identified by the machine learning algorithm or artificial intelligence or a deformation system.

In steps 430 and 440, the location and the shape of the anatomical structure may be identified by the deformation system. The identified location and shape show actual representation of the anatomical structure on the fly during the surgical operation. The deformation system may estimate the location of the anatomical structure in the coordinate system of the 3D model. Further, the deformation system may zoom-in or zoom-out the shape of the anatomical structure in the coordinate system of the 3D model.

Furthermore, in steps 430 and 440, the location and shape may be identified with the EMR. For example, the size or shape of the anatomical structure may reflect the age, sex, and BMI of the patient. Also, previous surgeries may be an important factor in change of the shape and size of the anatomical structure.

In step 450, it is determined whether or not the shape in the image is equal to the shape of the anatomical structure (hereinafter the "corresponding anatomical structure") in the 3D model, which corresponds to the anatomical structure in the image. When the shapes match or one of the shapes has a zoomed-in or zoomed-out shape of the other, it is determined that the two shapes are equal to each other in step 450.

When both shapes are determined to be different in step 450, the deformation system may update the shape of the corresponding anatomical structure in the 3D model to reflect the actual shape of the anatomical structure captured in the image in step 460. While doing so, the deformation system may have to update shapes and/or locations of other anatomical structures in the 3D model, which are connected or closely related to the corresponding anatomical structure in the 3D model.

When it is determined that the shapes match or one of the shapes has a zoomed-in or zoomed-out shape of the other in step 450, the deformation system does not have to update the shape of the anatomical structure in the 3D model because the shape of the anatomical structure in the 3D model represents the actual shape of the anatomical structure captured in the image.

Now, in step 470, the location of the anatomical structure captured in the image is compared with the location of the corresponding anatomical structure in the 3D model. Prior to this comparison, the deformation system may estimate the location of the anatomical structure, which is in the image, according to the coordinate system of the 3D model, and compare the estimated location with the location of the corresponding anatomical structure in the 3D model. In an aspect, when the difference between the estimated location and the location of the corresponding anatomical structure is smaller than a predetermined value, the deformation system may determine that both locations are equal to each other. In another aspect, the predetermined value may vary depending on the size of the anatomical structure. For example, the predetermined value for a large organ (e.g., stomach, live, or lung) may be larger than the predetermined value for a small organ (e.g., gall bladder or a small portion of the lung).

When both locations are determined to be equal to each other, the deformation system does not have to perform further updates to the 3D model. However, when both locations are determined to be different, the deformation system may have to move, in the 3D model, the corresponding anatomical structure to the estimated location in step 480. While doing so, any anatomical structures, which are connected to the corresponding anatomical structure, may be moved or updated as well based on a level of connectivity with the corresponding anatomical structure.

By updating the location and the shape of the corresponding anatomical structure in the 3D model in steps 460 and 480, the updated 3D model may reflect the actual location and shape of the anatomical structure captured in the images so that surgical operation may be facilitated at the substantially correct location with the substantially correct shape of the target anatomical structure.

Figure 5:
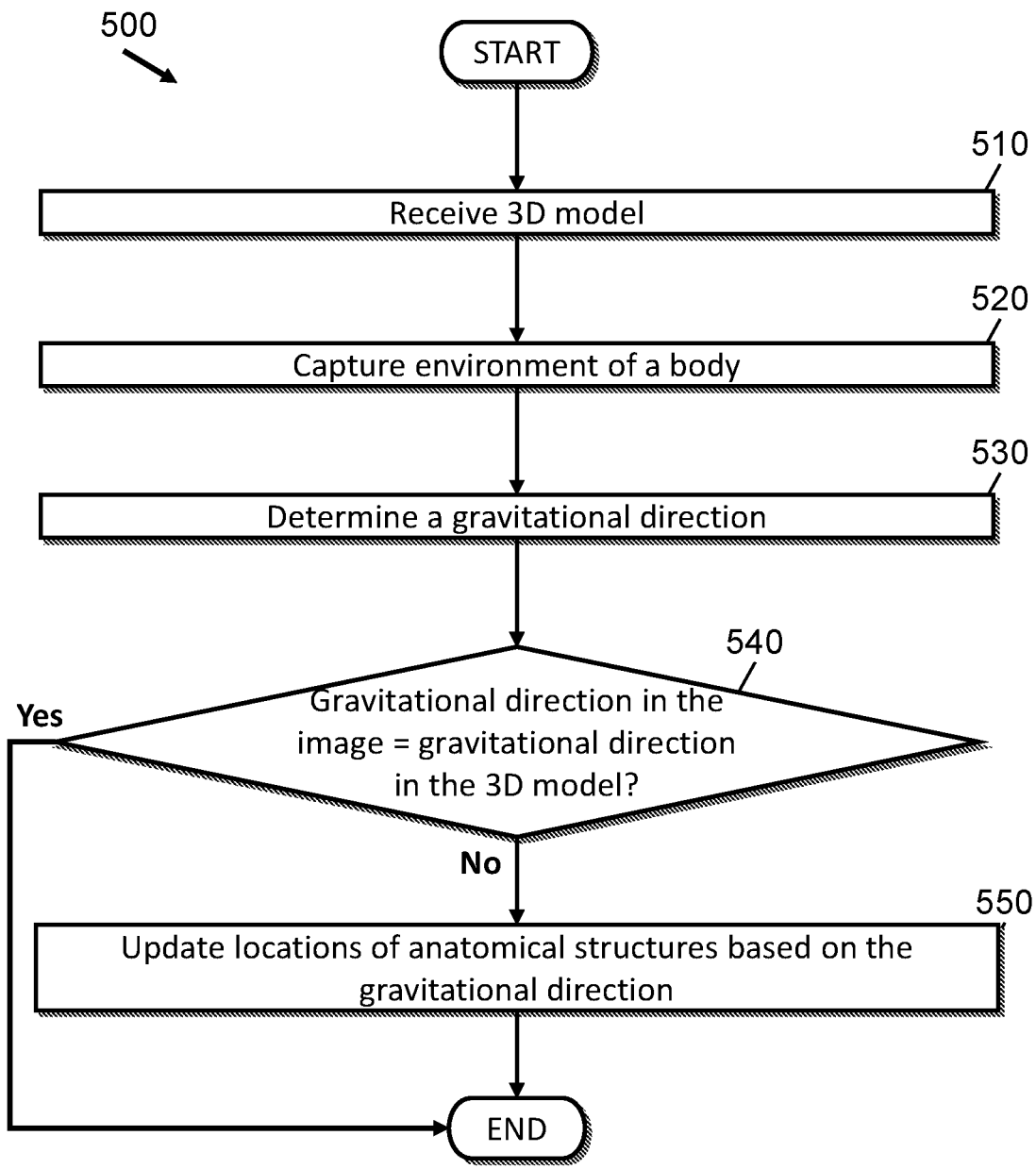
FIG. 5 is a flowchart for updating a 3D model based on a gravitational direction in accordance with aspects of the present disclosure.

FIG. 5 shows a method 500 for updating a 3D model based on a gravitational direction and a body position according to aspects of the present disclosure. The method 500 starts by receiving a 3D model of a patient in step 510. The 3D model may be previously generated with a gravitational direction. For example, the gravitational direction (hereinafter the first gravitational direction) may be a direction towards the spine of the patient.

The deformation system may include an imaging device, which captures images of the external environment of the body of the patient in step 520.

Based on the captured images, the deformation system may identify a gravitational direction (hereinafter the second gravitational direction) with respect to the body of the patient in step 530. The gravitational direction may alternatively be determined in any other suitable manner. Further, based on the captured images, a position or direction of the body may be identified. For example, the patient may be laid on the patient's stomach, left side, right side, or back.

In step 540, it is determined whether or not the first gravitational direction is equal to the second gravitational direction. When they are determined to be equal, no update to the 3D model is needed with respect to the gravitational direction.

On the other hand, when the first gravitational direction is determined to be different from the second gravitational direction, the deformation system may update locations of the anatomical structures in the 3D model based on the second gravitational direction in step 550. In this regard, the deformation system may be trained with previously captured images or 3D models and changes caused by the corresponding gravitational directions.

In aspects, the methods 400 and 500 may be separately, concurrently, or sequentially performed to accommodate any changes in anatomical structures and in the gravitational direction.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

What is claimed is:

1. A system for updating a three-dimensional (3D) model based on a deformed or displaced anatomical structure in a body, the system comprising:
   a first imaging device configured to capture an image inside of a body;
   a location sensor installed in the first imaging device and configured to identify a location of the first imaging device;
   a second imaging device configured to capture an image of an external environment of the body;
   a memory configured to store one or more programs and a 3D model of at least a portion of the body; and
   a controller configured to perform the one or more programs to:
      identify a location of an anatomical structure, which is captured in the image, in the body based on the location of the location sensor;
      identify a shape of the anatomical structure in the image;
      associate a corresponding anatomical structure in the 3D model with the anatomical structure in the image based on the location and the shape;
      identify a gravitational direction based on the image captured by the second imaging device; and
      update the corresponding anatomical structure in the 3D model based on the location and the shape of the anatomical structure in the image and the gravitational direction.

2. The system according to claim 1, wherein the controller is further configured to identify a position of the body based on the image captured by the second imaging device.

3. The system according to claim 2, wherein 3D model is updated by moving a non-stable anatomical structure based on the gravitational direction and the position of the body.

4. The system according to claim 3, wherein the non-stable anatomical structure changes its location depending on the gravitational direction and the position of the body.

5. The system according to claim 1, wherein the controller is further configured to determine whether or not the location of the anatomical structure in the image is different from a location of the corresponding anatomical structure in the 3D model.

6. The system according to claim 5, wherein the controller is further configured to update the location of the corresponding anatomical structure in the 3D model based on the location of the anatomical structure in the image, when it is determined that the location of the anatomical structure in the image is different from the location of the corresponding anatomical structure in the 3D model.

7. The system according to claim 1, wherein the controller is further configured to determine whether or not the anatomical structure in the image has a zoomed shape of the corresponding anatomical structure of the 3D model.

8. The system according to claim 7, wherein the controller updates the shape of the corresponding anatomical structure in the 3D model based on the shape of the anatomical structure in the image, when it is determined that the anatomical structure in the image does not have the zoomed shape of the corresponding anatomical structure in the 3D model.

9. The system according to claim 1, wherein the one or more programs are trained by a machine learning algorithm.

10. A method for updating a three-dimensional (3D) model based on deformed or displaced anatomical structure in a body, the method comprising:
    receiving a 3D model of at least a portion of a body;
    capturing, by a first imaging device, an image inside of the body;
    identifying, by a location sensor installed in the first imaging device, a location of the first imaging device;
    identifying a location of an anatomical structure, which is captured in the image, in the body based on the location of the location sensor;
    identifying a shape of the anatomical structure in the image;
    associating a corresponding anatomical structure in the 3D model with the anatomical structure in the image based on the location and the shape;
    capturing, by a second imaging device, an image of an external environment of the body;
    identifying a gravitational direction based on the image captured by the second imaging device; and
    updating the corresponding anatomical structure in the 3D model based on the location and the shape of the anatomical structure in the image and the gravitational direction.

11. The method according to claim 10, further comprising:
    identifying a position of the body based on the image captured by the second imaging device.

12. The method according to claim 11, wherein the corresponding anatomical structure in the 3D model is updated by moving a non-stable anatomical structure based on the gravitational direction and the position of the body.

13. The method according to claim 12, wherein the non-stable anatomical structure changes its location depending on the gravitational direction and the position of the body.

14. The method according to claim 10, further comprising:
    determining whether or not the location of the anatomical structure in the image is different from a location of the corresponding anatomical structure in the 3D model.

15. The method according to claim 14, further comprising:
    updating the location of the corresponding anatomical structure in the 3D model based on the location of the anatomical structure in the image, when it is determined that the location of the anatomical structure in the image is different from the location of the corresponding anatomical structure in the 3D model.

16. The method according to claim 10, further comprising:
    determining whether or not the anatomical structure in the image has a zoomed shape of the corresponding anatomical structure in the 3D model.

17. The method according to claim 16, further comprising:
    updating the shape of the corresponding anatomical structure in the 3D model based on the shape of the anatomical structure in the image, when it is determined that the anatomical structure in the image does not have the zoomed shape of the corresponding anatomical structure in the 3D model.

18. A nontransitory computer-readable storage medium storing a program for causing a computer to execute a method for updating a three-dimensional (3D) model based on deformed or displaced anatomical structure in a body, the method comprising:
    receiving a 3D model of at least a portion of a body;
    capturing, by a first imaging device, an image inside of the body;
    identifying, by a location sensor installed in the first imaging device, a location of the first imaging device;
    identifying a location of an anatomical structure, which is captured in the image, in the body based on the location of the location sensor;
    identifying a shape of the anatomical structure in the image;
    associating a corresponding anatomical structure in the 3D model with the anatomical structure in the image based on the location and the shape;
    capturing, by a second imaging device, an image of an external environment of the body;
    identifying a gravitational direction based on the image captured by the second imaging device; and
    updating the corresponding anatomical structure in the 3D model based on the location and the shape of the anatomical structure in the image and the gravitational direction.

* * * * *